June 23, 1964  P. M. ENGLE ETAL  3,138,443

FILTER

Original Filed March 7, 1960  2 Sheets-Sheet 1

*INVENTORS*
*PAUL M. ENGLE*
*CARL J. BAUDER*
BY

ATTORNEY

June 23, 1964 P. M. ENGLE ETAL 3,138,443
FILTER
Original Filed March 7, 1960 2 Sheets-Sheet 2

INVENTORS
PAUL M. ENGLE
CARL J. BAUDER
BY
ATTORNEY 3,138,443
FILTER
Paul M. Engle and Carl J. Bauder, Syracuse, N.Y., assignors to Cambridge Filter Manufacturing Corporation, Syracuse, N.Y., a corporation of New York
Original application Mar. 7, 1960, Ser. No. 13,318. Divided and this application Apr. 30, 1962, Ser. No. 190,968
1 Claim. (Cl. 55—499)

This invention relates to air filters and more particularly to a cartridge unit employing pleated filter media.

In filter cartridge units employing pleated filter media it is of importance to provide a disposable cartridge of inexpensive construction, and yet of sufficient strength to withstand the differential pressure to which the unit is subjected, so as to prevent rupture. The present invention is directed to an elongated cartridge in which the pleats extend crosswise of the cartridge and in which the ends of the pleated filter media are bound in with the end portion of an inexpensive fibrous sheet material frame, in such a way as to secure the media ends to the frame and assure a seal. The invention further contemplates the formation of a frame of light weight fibrous sheet material or fiber board to which the pleat edges of the media are adhesively secured. The unit so constructed is employed in a suitable duct frame, wherein it is readily insertable and replaceable, as often as the unit becomes fouled.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1:
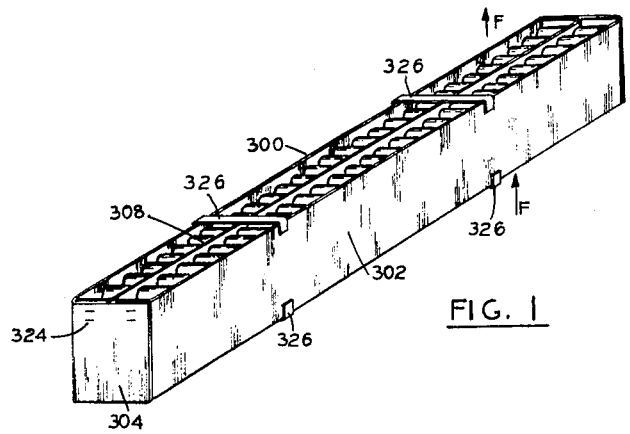
FIGURE 1 is a perspective view of a completed filter unit.
Figure 2:
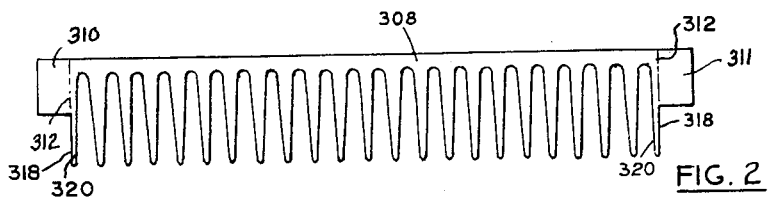
FIGURE 2 is a plan view of a spacer comb blank employed in the unit.
Figure 3:
FIGURE 3 is a plan view of one of the side wall members in blank form.
Figure 4:
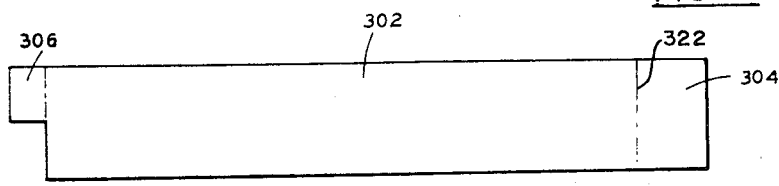
FIGURE 4 is a plan view of the other side wall member in blank form.
Figure 5:
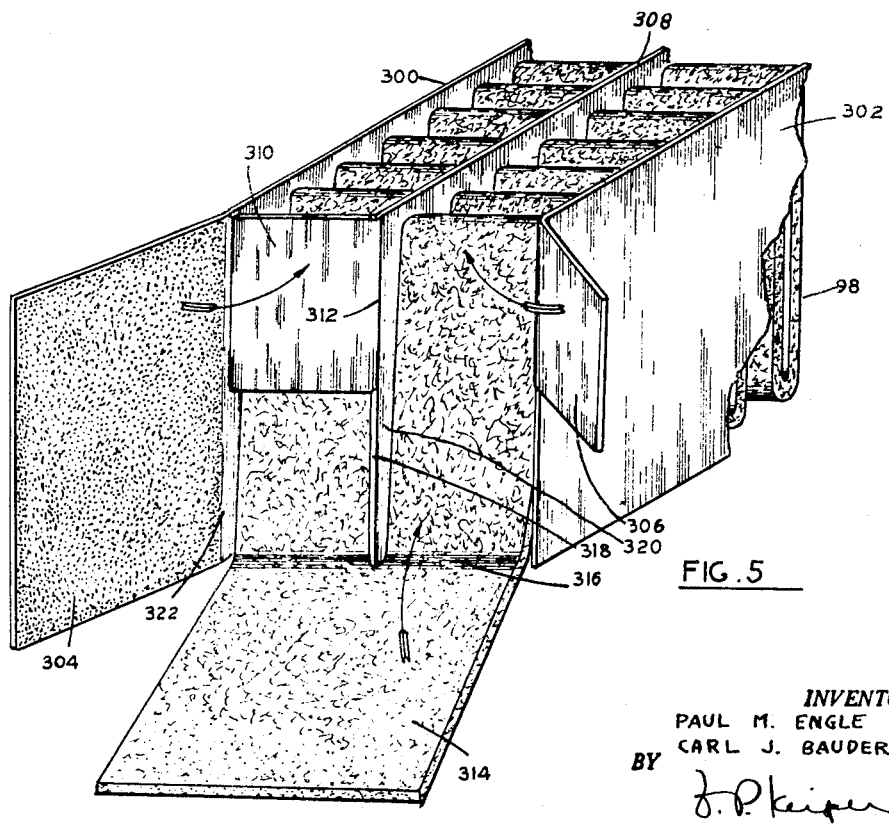
FIGURE 5 is a fragmentary perspective view of the filter unit in an intermediate stage of assembly.

Referring to FIGURES 1 and 5, of the drawings, there is shown a filter cartridge unit employing filter media 98 in pleated formation disposed in an elongated rectangular frame composed of side members 300 and 302, having end flaps, formed of heavy cardboard or the like, adhesively secured to the edges of the pleated media.

The cartridge is composed of spaced elongated side wall members 300 and 302 formed of fiber board, between which is interposed filter media 98 arranged in pleated formation. The side edges of the pleated media are adhesively or otherwise secured to the members 300 and 302. A comb 308 of fiber board provides a central support to the flexible filter media pleats to maintain the adjacent flanks thereof spaced when subjected to differential pressure due to air flow in the direction of arrow F. One or more transverse stays 326 in the form of strip material are adhesively or otherwise attached at their ends to the members 300 and 302 to prevent any tendency of the side members 300 and 302 to spread.

As will be understood from FIGURE 5, in the completed filter, the end flap 310 of the comb 308 is disposed in a common end plane along with the end flap 306 of the side member 302, and the end 314 of the filter media is sandwiched between the flaps 306 and 310, and the end flap 304 of the side member 300. The inside surface of the flap 304 is provided with adhesive and the flaps 310 and 306, with the intervening end 314 of the filter media, and the end flap 304 are stapled together as indicated at 324. Each end of the filter is similarly completed, the flap 311 of the comb at the other end being folded in the opposite direction from flap 310, in assembly.

Each of the side members 300 and 302 may be alike and is provided with rectangular integral end flaps 304 and 306, one approximating the dimensions of the end of the filter unit, and the other being half as wide and extending downwardly from the upper edge, a little more than half way. While the side members 300 and 302 are held against the side edges of the formed filter media, the comblike member 308 is inserted to render support to the media, and prevent collapse when the filter is put to use, under differential pressure caused by air flow in the direction of arrows F. Such member is provided with end flaps 310 and 311 of approximately the same rectangular shape as the end flap 306 of the side members. When the comb is in place, the flap 310 at one end is swung on its score 312 to lie in a plane transverse of the length of the filter, and thereafter, the flap 306 of the side member 302 is bent to lie in the same plane with flap 310. Adhesive may be applied to the outer surfaces of these flaps at this time. Thereafter the end of the filter medium 314 is folded along the line 316 so that the end extends in a vertical plane against the edge 318 of the last half tooth 320 of the comb and against the outer surfaces of flaps 306 and 310. Thereafter flap 304 is bent along its scoring 322 so as to lie across the end, with the end 314 of the filter media disposed between the flaps 310 and 306 and flap 304. A number of staples or other means 324 may thereupon be inserted through the flap 306 and flap 304, with the end of the filter media sandwiched between, and additional staples may be inserted through flap 310 and flap 304, likewise with the end of the filter media sandwiched therebetween.

The filter media at the other end of the unit is cut from the source of supply with a length similar to that shown at 314 and the end flaps of the comb and the side members are closed in, in the same manner.

Thereafter one or more narrow strips of scotch tape 326, or other similar tape may be adhesively applied across the filter on both sides at suitably spaced intervals, the number depending on the overall length of the filter unit. Such tapes resist any strain which might tend to spread the side members from the filter media.

The filter media may be a composite of layers of different materials, and may have included a thin mesh fabric on one side to provide sufficient tensile strength to the filter media proper should the same lack sufficient tensile strength during the pleating operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

This application is a division of application Serial No. 13,318, filed March 7, 1960.

What is claimed is:

An elongated pleated air filter unit comprising a pair of spaced parallel elongated fiberboard rectangular side members, a single elongated strip of pleated filter media disposed between said side members, with the pleat edges adhesively secured to the members, an elongated supporting comb like member of fibrous material disposed between said side members and extending parallel and substantially midway therebetween and having a plurality of tongues projecting into each of the pleats of filter media from the air outlet side of the filter unit, said side members and comb like member all having end flaps at both ends of the unit, said end flaps being secured together in overlapping relation at each end with an end of the pleated filter material sandwiched between the end flaps.

References Cited in the file of this patent

UNITED STATES PATENTS

| | | |
|---|---|---|
| 1,830,096 | Dollinger | Nov. 3, 1931 |
| 2,681,155 | Graham | June 15, 1954 |
| 2,814,355 | Powers | Nov. 26, 1957 |
| 2,857,017 | Nutting | Oct. 21, 1958 |
| 2,907,408 | Engle et al. | Oct. 6, 1959 |

FOREIGN PATENTS

| | | |
|---|---|---|
| 569,458 | Great Britain | May 24, 1945 |